(12) United States Patent
Lindsay (10) Patent No.: US 12,479,603 B2
(45) Date of Patent: Nov. 25, 2025

(54) METHOD AND DEVICE FOR CAPTURE OF TUMBLING SPACE OBJECTS

(71) Applicant: Astroscale Holdings Inc., Tokyo (JP)

(72) Inventor: Michael Lindsay, Tokyo (JP)

(73) Assignee: Astroscale Holdings Inc., Tokyo (JP)

( * ) Notice: Subject to any disclaimer, the term of this patent is extended or adjusted under 35 U.S.C. 154(b) by 0 days.

(21) Appl. No.: 18/272,040

(22) PCT Filed: Oct. 21, 2021

(86) PCT No.: PCT/JP2021/038917
§ 371 (c)(1),
(2) Date: Jul. 12, 2023

(87) PCT Pub. No.: WO2022/153639
PCT Pub. Date: Jul. 21, 2022

(65) Prior Publication Data
US 2024/0101280 A1  Mar. 28, 2024

Related U.S. Application Data

(60) Provisional application No. 63/137,680, filed on Jan. 14, 2021.

(51) Int. Cl.
*B64G 1/28* (2006.01)
*B64G 1/10* (2006.01)
(Continued)

(52) U.S. Cl.
CPC ............. *B64G 1/28* (2013.01); *B64G 1/1081* (2023.08); *B64G 1/2224* (2023.08); *B64G 1/244* (2019.05); *B64G 1/6462* (2023.08)

(58) Field of Classification Search
CPC ................................ B64G 1/28; B64G 1/1081
See application file for complete search history.

(56) References Cited

U.S. PATENT DOCUMENTS 4,747,567 A    5/1988  Johnson
4,775,120 A *  10/1988  Marwick .................. B64G 1/62
                                                        376/288

(Continued)

FOREIGN PATENT DOCUMENTS

EP        3372511 A1    9/2018
JP    2018-172110 A    8/2018
(Continued)

OTHER PUBLICATIONS

International Searching Authority, International Search Report and Written Opinion mailed Jan. 11, 2022 in PCT/JP2021/038917.
(Continued)

*Primary Examiner* — Joshua D Huson
*Assistant Examiner* — Anna L. Gordon
(74) *Attorney, Agent, or Firm* — Maine Cernota & Curran (57) ABSTRACT

According to an aspect of the present invention, there is provided a method comprising: propelling a servicing spacecraft to an object; deploying one or more counter mass(es) away from a servicing spacecraft bus to offset the center of mass of the servicing spacecraft into an empty volume; approaching the object, by the servicing spacecraft; positioning the center of mass of the servicing spacecraft in approximately the same location as the center of mass of the object; imparting angular momentum to the servicing spacecraft to match the tumble rate of the object; and contacting the object with one or more mechanical attachments to the servicing spacecraft.

9 Claims, 6 Drawing Sheets

(51) Int. Cl.
*B64G 1/22* (2006.01)
*B64G 1/24* (2006.01)
*B64G 1/64* (2006.01)

(56) References Cited

U.S. PATENT DOCUMENTS

| | | | |
|---|---|---|---|
| 5,129,600 | A | 7/1992 | Polites |
| 7,207,525 | B2 | 4/2007 | Bischof |
| 8,226,046 | B2 | 7/2012 | Poulos |
| 2007/0125910 | A1* | 6/2007 | Cepollina ............ B64G 1/2427 244/172.6 |
| 2009/0166476 | A1 | 7/2009 | Termini |
| 2012/0286100 | A1 | 11/2012 | Knirsch |
| 2015/0053823 | A1 | 2/2015 | Bigelow |
| 2016/0130020 | A1 | 5/2016 | Chambert |
| 2018/0148197 | A1* | 5/2018 | Halsband ............... B64G 1/646 |
| 2018/0251240 | A1 | 9/2018 | Reitman |
| 2020/0262589 | A1 | 8/2020 | Turner |
| 2022/0219841 | A1 | 7/2022 | Mukae |

FOREIGN PATENT DOCUMENTS

| | | |
|---|---|---|
| WO | WO 2011/066233 | 6/2011 |
| WO | WO 2020/261397 | 12/2020 |

OTHER PUBLICATIONS

Caubet, Albert et al, Design of an Attitude Stabilization Electromagnetic Module for Detumbling Uncooperative Targets, 2014 IEEE Aerospace Conference, Mar. 2014.

Bennett, T. et al, "Prospects and challenges of touchless electrostatic detumbling of small bodies", Advances in Space Research, Elsevier, vol. 56, No. 3, Apr. 4, 2015.

* cited by examiner

METHOD AND DEVICE FOR CAPTURE OF TUMBLING SPACE OBJECTS

This Application is a national stage filing under 35 U.S.C. § 371 of international application PCT/JP2021/038917 entitled "Method and Device for Capture of Tumbling Space Objects" filed Oct. 21, 2021 which claims priority to U.S. Provisional Patent Application No. 63/137,680 entitled "Method for Capture of Tumbling Space Debris" filed Jan. 14, 2021, both of which are hereby incorporated by reference in their entireties.

TECHNICAL FIELD

Embodiments of the present invention relate to a method and device for capture of tumbling space objects.

BACKGROUND ART

A variety of approaches have been proposed for using external control torque to attenuate the angular velocity of an object in orbit, a process known as detumbling.

For example, U.S. Pat. No. 8,226,046B2 discloses a method of stabilizing unstable space debris, comprising: applying force to the unstable space debris at target points on the unstable space debris, generating stabilized space debris; wherein the force is generated by pneumatic impingement of the unstable space debris with a gas plume applied by an adjacent satellite; and wherein the force is sufficient to generate a torque on the unstable space debris that will dampen the rotational momentum about one or more of the axes of rotation of the unstable space debris.

Nevertheless, prior art methods suffer from substantial limitations, including the inability to safely and economically attenuate the angular velocity of an object in orbit.

CITATION LIST

Patent Literature

Patent Document 1
U.S. Pat. No. 8,226,046 B2

SUMMARY OF INVENTION

Technical Problem

In view of the above circumstances, aspects of present invention provide a method and device for capture of a tumbling space object that can attenuate the angular velocity of the object in orbit.

Solution to Problem

According to an aspect of the present invention, there is provided a method comprising: propelling a servicing spacecraft to an object; deploying one or more counter mass(es) away from a servicing spacecraft bus to offset the servicing spacecraft center of mass; approaching the object, by the servicing spacecraft; positioning the center of mass of the servicing spacecraft in approximately the same location as the center of mass of the object; imparting angular momentum to the servicing spacecraft to match the tumble rate of the object; and contacting the object with one or more mechanical attachments to the servicing spacecraft.

According to another aspect of the present invention, there is provided a spacecraft comprising: a bus; one or more counter mass(es); and a truss connecting the bus and the one or more counter mass(es), wherein the truss is configured to deploy the counter masses away from the bus to offset the center of mass of the spacecraft into an empty volume.

DESCRIPTION OF EMBODIMENTS

Embodiments illustrative of the present invention will be described with reference to the attached drawings. Note that constituents denoted by the same symbols have the same or similar configurations in respective figures.

Space debris and derelict satellites are expected to be tumbling about arbitrary axes in space. The removal of such objects requires physical contact by a servicing spacecraft in order to first detumble, then next deorbit the object.

If the object has high amounts of relative velocity or rotation with respect to the servicing spacecraft, any attempt at physical contact presents a collision and shock risk to both objects and may either cause damage or additional space debris. It is therefore ideal to reduce the relative velocity and rotation by performing either of the following actions:

Option 1: Reduce the absolute rotation rates of the object through non-contact means, such as ion beams, electromagnetic induction, or applied fluidic forces.

Option 2: Use propulsion to put the servicing spacecraft in a forced-motion orbit around the object, matching the tumble rates and zeroing out relative rotation.

Option 1 has not been proven, comes with additional damage risk to the tumbling object, and typically requires the consumption of resources on board the servicing spacecraft.

Option 2 requires frequent and high thrust to attain zero relative motion. It also requires significant consumption of fuel resources on board the servicing spacecraft.

In both cases, the consumption of resources requires higher launch mass that scales with the number of objects that are to be captured, which greatly increases cost.

A method of zeroing relative rotation rates between object and servicing spacecraft that does not use a consumable resource would theoretically enable unlimited captures. An embodiment described herein presents a novel solution to use angular momentum, which can be created mechanically, to attain zero relative rotation with respect to objects. Mechanically created momentum does not require the consumption of any massive resources.

The present invention generally relates to a method and device for capture of tumbling space debris, the method and device being able to attenuate the angular velocity of an object in orbit.

Figure 1:
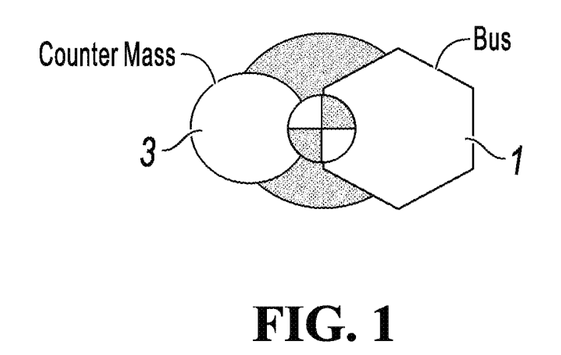
FIG. 1 illustrates a counter mass and a spacecraft bus in stowed configuration for launch.

FIG. 1 illustrates spacecraft bus 1 and counter mass 3 in stowed configuration for launch.

The structural body and primary system of a space vehicle is commonly referred to as a spacecraft bus. Bus is a generic term that can apply to any spacecraft infrastructure that supports the main subsystems of the spacecraft. Every spacecraft that has ever been launched has a bus housing electronics and computers. Spacecraft bus 1 can be, for example, Boeing DS&S 702; Lockheed Martin Space Systems A2100 Alphabus; INVAP ARSAT-3K; Airbus D&S Eurostar; ISRO's I-1K, I-2K, I-3K, I-4K, I-6K, and Indian Mini Satellite bus; NASA Ames MCSB; SSL 1300; Orbital ATK GEOStar; and Mitsubishi Electric DS2000. Embodiments of the present invention may utilize a custom bus assembled with different components sourced from different manufactures. Very advanced propulsion systems may be needed for certain mission profiles; for a standard spacecraft mission, the bus may not need to be specially configured. Missions according to the present invention may have unique requirements which a commercially available bus cannot meet. In those cases, the computer, power system, and payload, for example, are custom designed and assembled.

Counter mass 3 can be spherical, which is more volume efficient, or cubical, which is potentially more easily manufacturable. Counter mass 3 can be made of aluminum or other metals. While steel would be mass-efficient, it does not easily burn in the atmosphere so it may not be ideal to use this material. It is also worth noting that the counter mass does not have to be dumb or sole-purpose. In other words, the counter mass could house batteries, fuel, thrusters, sensors, reaction wheels or other dense equipment that the servicer uses. In this way, the counter masses can serve a dual-purpose which reduces the overall mass of the servicer, removing the need to "double" the total mass.

Figure 2:
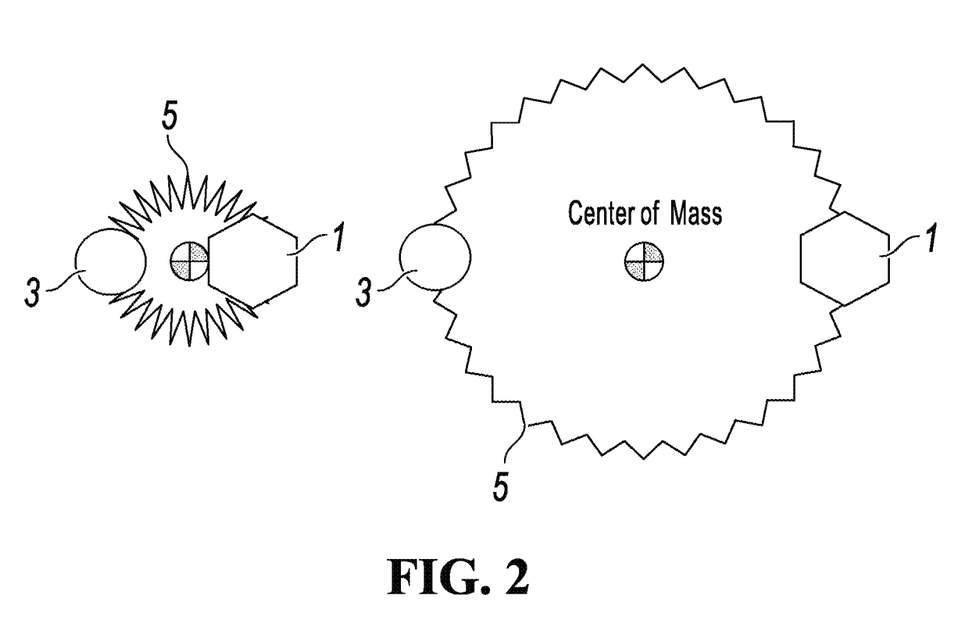
FIG. 2 illustrates deployment of an expandable and collapsible truss structure connecting the counter mass and the spacecraft bus.

FIG. 2 illustrates deployment of truss structure 5 connecting counter mass 3 and spacecraft bus 1.

A truss is an assembly of beams or other elements that creates a rigid structure. In some embodiments, a truss is a structure that derives advantages from the inherent stability and weight distribution of a triangle. A web of triangles can be joined, which can cause stress to be evenly distributed across the entire structure and thereby provide a number of practical advantages.

Truss structure 5 can be made of aluminum or composite material such as carbon fiber reinforced polymer (CFRP). The circular truss is imagined to be similar to the circular hoop truss structure commonly used to deploy very large antenna reflectors in geostationary orbit. For an expandable and contractible truss structure, one size is suitable for a range of target object sizes, but because contraction is technically challenging, it may be advantageous to have different classes of diameters of truss structure, for example 1-5 m and 10 m. The length of a spacecraft's robotic arm defines the maximum range between object and servicer. A longer robotic arm enables a larger truss structure to be used for capture of a smaller object.

For a configuration of truss structure 5 that is contractable, a cable and pulley system can be used, which is particularly suited for a circular truss structure. For a straight-arm truss structure, arms can be folded with motors at the joints. In a configuration which is unable to contract, springs could be used, or carbon fiber tape-springs for deployment.

Sufficient clearance for the deployment of truss structure 5 depends on the size of the object that is being captured. Sufficient clearance allows for circumnavigation of an object via rotation and an empty volume with diameter greater than that of the client object. A certain clearance is necessary for safety, but clearance is limited by the length of the robotic arm. A robotic arm around 2 meters is used in one exemplary embodiment, but a longer robotic arm is possible. Thus, the truss structure may need to be deployed within 2 meters of a client object.

Figure 3:
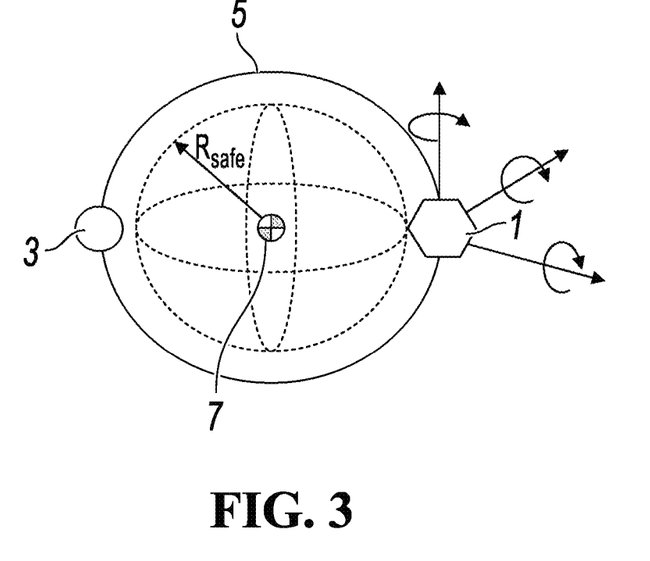
FIG. 3 illustrates the spacecraft bus imparting angular momentum to the system of spacecraft bus and counter mass connected by the expandable and collapsible truss structure.

FIG. 3 illustrates spacecraft bus 1 imparting angular momentum to the system of spacecraft bus 1 and counter mass 3 connected by expandable and collapsible truss structure 5.

Prior art methods of capturing tumbling space debris have attempted to have the servicing spacecraft match the motion of the client object. If a client object is rotating around a single axis, a servicing spacecraft could use its thrusters to match the angular velocity such that there is no relative motion. When a client object has angular velocity in the direction of all three axes, the servicing spacecraft must employ frequent and high thrust to attain zero relative motion, which requires a significant consumption of fuel resources on board the servicing spacecraft.

Embodiments of the present disclosure can force the servicing spacecraft to match the motion of the client object 51 (FIGS. 7-10). First, the center of mass 7 of truss structure 5 connecting counter mass 3 and spacecraft bus 1 is positioned in approximately the same location as the center of mass of the object 51. Then spacecraft bus 1 can use mechanically (or by other means) generated angular momentum to achieve a tumble state that matches that of client object 51.

Angular momentum can be imparted by torque generated by flywheels or magnetorquers on spacecraft bus 1. For a 15 m diameter structure moving at 3 degrees per second, however, there are no commercially available flywheels that can achieve such a large amount of angular momentum. A control moment gyroscope could be used but it may more be efficient in this scenario to use chemical thrusters to generate torque. As torque is equal to force times distance from the axis of rotation to the point where the force is applied, the firing of thrusters mounted away from the servicer center of gravity provides fuel-efficient means of generating torque. Thrusters mounted on spacecraft bus 1 can create torques along the proper axes to attain the desired rotation state. Thrusters mounted elsewhere along the truss structure or on counter mass 3 could improve the efficiency of imparting torques along additional axes, and help zero out the linear momentum transfer. Thrusters on one end will impart torque as well as linear change in momentum. Thrusters at opposite ends can isolate angular momentum thrust. In this way, thrusters and flywheels perform same function.

Figure 4:
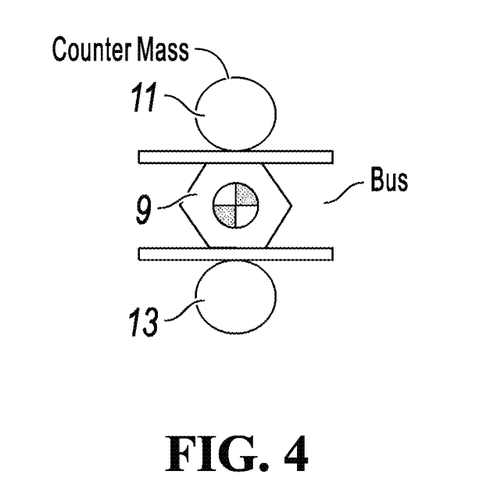
FIG. 4 illustrates two counter masses and a spacecraft bus in stowed configuration for launch.

FIG. 4 illustrates counter masses 11 and 13 and spacecraft bus 9 in stowed configuration for launch.

Generally, launch vehicles appropriate for launch of spacecraft bus 1 and counter mass 3 are also suitable for launch of spacecraft bus 9 and counter masses 11 and 13. Typically embodiments with more than one counter mass are suitable for the same type of launch vehicle as embodiments with one counter mass, but the masses of embodiments can vary substantially and some embodiments may require different launch vehicles than others.

Satellites in commercial, research and government service often are compacted into various forms for launch and transport then deploy into different shapes during service. Stowed configurations can be folded in any number of ways, depending on the spacecraft bus utilized. Embodiments of the present invention differ from typical, satellites due to the presence of one or more counter mass, and the shape, weight and size of the counter masses necessitate particular attention to configuration during launch.

Figure 5:
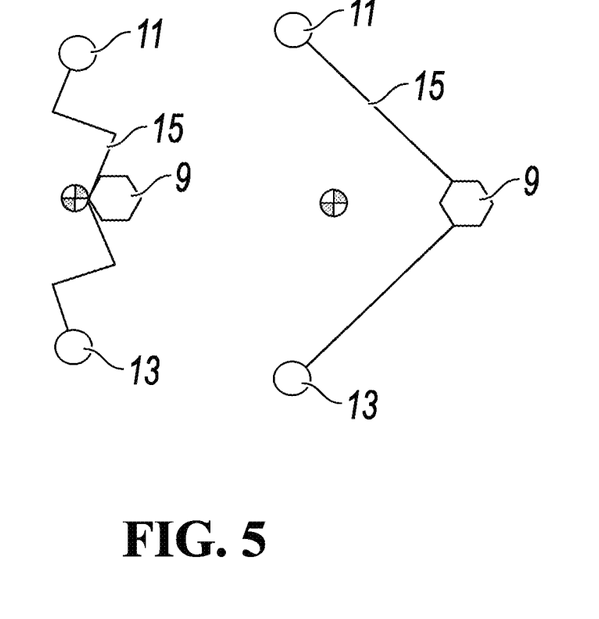
FIG. 5 illustrates deployment of an expandable and collapsible truss structure connecting the two counter masses and the spacecraft bus.

FIG. 5 illustrates deployment of truss structure 15 connecting counter masses 11 and 13 and spacecraft bus 9.

Deployment of two or more counter masses occurs in some embodiments. For a linear type truss structure, there must be 2 or more counter masses because the center of gravity and safe volume must be kept clear. Otherwise a linear truss with a single counter mass would go directly through the center of gravity in the safe volume. Each linear deployment must deploy the counter mass away from the center of gravity, which offsets the center of gravity both X and Y directions. The Y direction offset has to be balanced by another counter mass in the −Y direction. Having a circular or circular segment truss structure solves, this problem by keeping the center of gravity clear in the safe volume. Additionally, if angular momentum of the servicer system is to be imparted with thrusters, it is advantageous to have thrusters positioned at some distance away from the X-axis, in order to increase the thrusters' moment arms. With a single counter mass that is on the same axis as the bus, this momentum is difficult to impart as efficiently (with thrusters). From a functional perspective, having additional counter masses helps with redundancy and making the system more robust.

In various embodiments, truss structure 5, spacecraft bus 9 and counter masses 11 and 13 can be arranged in many different fashions. Counter masses 11 and 13 may be relatively near to each other, or they may be relatively remote from each other, and may also be nearer or further from the spacecraft bus. Different configurations can lead to different advantages in service. In a circular structure there is no limit to how close or far apart counter masses are situated, and in some embodiments counter masses could move along a circular truss structure.

Figure 6:
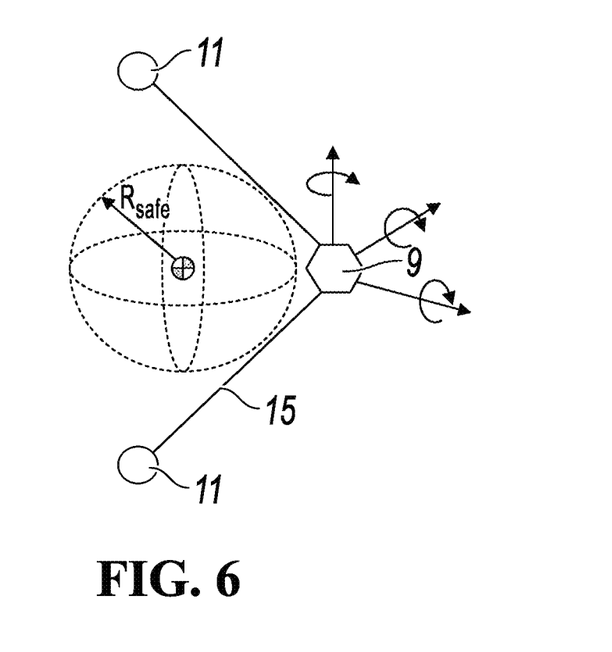
FIG. 6 illustrates the spacecraft bus imparting angular momentum to the system of spacecraft bus and two counter masses connected by the expandable and collapsible truss structure.

FIG. 6 illustrates spacecraft bus 9 imparting angular momentum to the system of spacecraft bus 9 and counter masses 11 and 13 connected by expandable and collapsible truss structure 15.

The total momentum of the system of spacecraft bus 9 and counter masses 11 and 13 and client object 51 remains approximately conserved if external forces are negligible, which they are expected to be in some embodiments.

In various embodiments, spacecraft bus 9 and counter masses 11 and 13 can match the velocity and rotation of client object 51 or spacecraft bus 9 and counter masses 11 and 13 and client object 51 can match a third velocity and rotation initially associated with neither of the systems.

Figure 7:
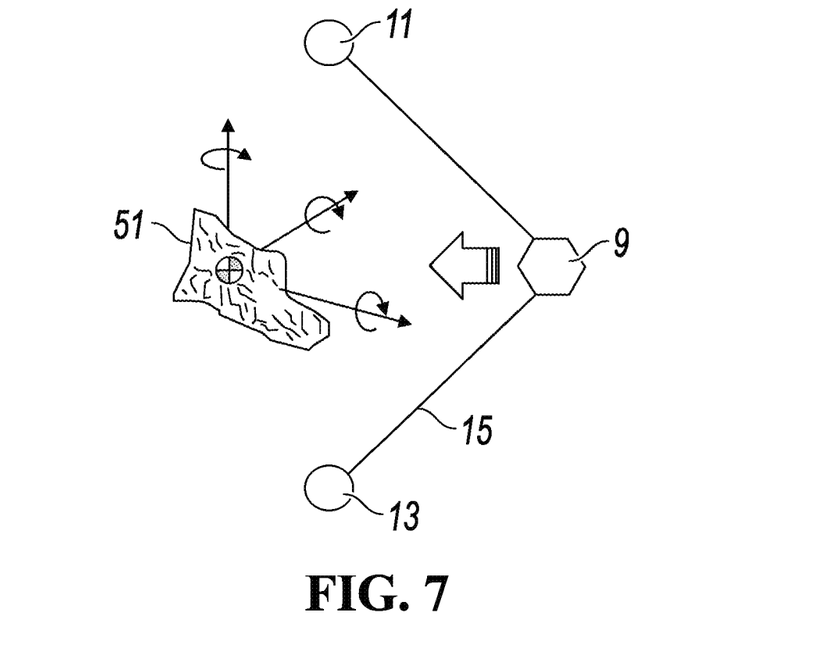
FIG. 7 illustrates a spacecraft approaching a client object that is tumbling arbitrarily about three axes.

FIG. 7 illustrates the system comprising spacecraft bus 9, counter masses 11 and 13, and expandable and collapsible truss structure 15 approaching client object 51 that is tumbling arbitrarily about three axes.

The motion of client object 51 tumbling through space is a combination of translation of the center of mass of client object 51 and rotation about one or more axes through the center of mass of client object 51.

In embodiments, it is possible to identify three rotational axes of client object 51. When client object 51 rotates about one of the axes at a certain angular velocity, the angular momentum of client object 51 is given by the product of its angular velocity and its moment of inertia corresponding to this rotational axis. These moments of inertia are called principal moments of inertia, and the rotational axes are called principal axes of rotation.

Client object 51 can have forward/backward, up/down, and left/right translational motion in three perpendicular axes, as well as rotation about three perpendicular axes, often termed yaw (normal axis), pitch (transverse axis), and roll (longitudinal axis). In addition to rotation about the principal axes of client object 51, rocking, swaying, or nodding motion whereby the axes change known as nutation is possible. In some systems with large amounts of liquid on board, a sloshing mechanism can add more chaotic characteristics to the rotation, but this is expected to be minimal in most clients where liquid is either expended, vented, or frozen before capture.

Figure 8:
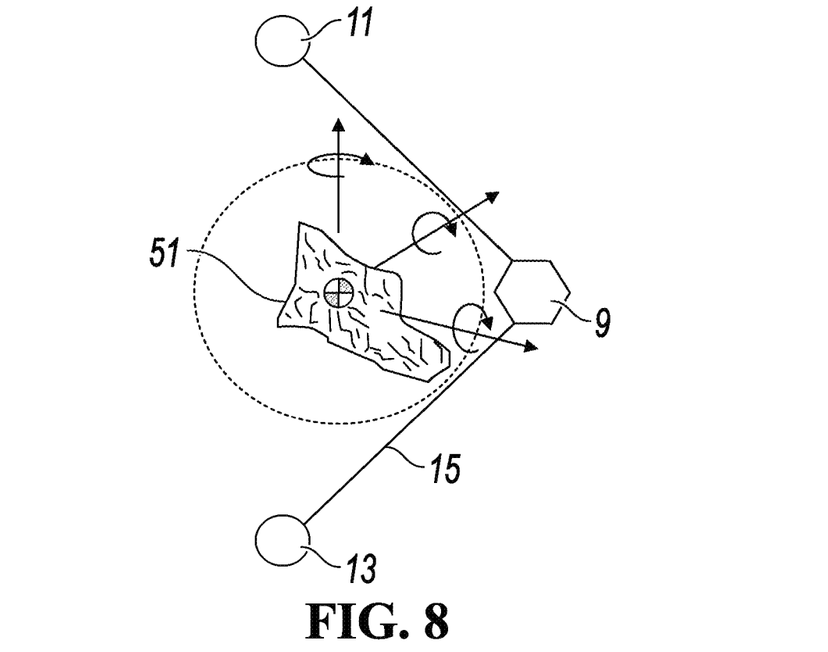
FIG. 8 illustrates the spacecraft aligning its center of mass with the client object.

FIG. 8 illustrates the system comprising spacecraft bus 9, counter masses 11 and 13, and expandable and collapsible truss structure 15 aligning its center of mass with client object 51.

Embodiments can differ in the methods used to calibrate alignment with the center of mass of client object 51. Spacecraft bus 9 can include a 3D visual sensor, such as a stereo camera or a light detection and ranging (LiDAR) sensor, for measuring parameters (such as, a position, orientation, angular velocity, and acceleration) of client object 51. Spacecraft bus 9 can include also equipment for measuring parameters (such as, a position, orientation, angular velocity, and acceleration) of the system comprising spacecraft bus 9, counter masses 11 and 13, and truss structure 15. Data is commonly sent to the ground via RF communication link for additional processing of tumble rates and sensor data to better understand the dynamic characteristics of the client by ground systems and engineers on ground.

Figure 9:
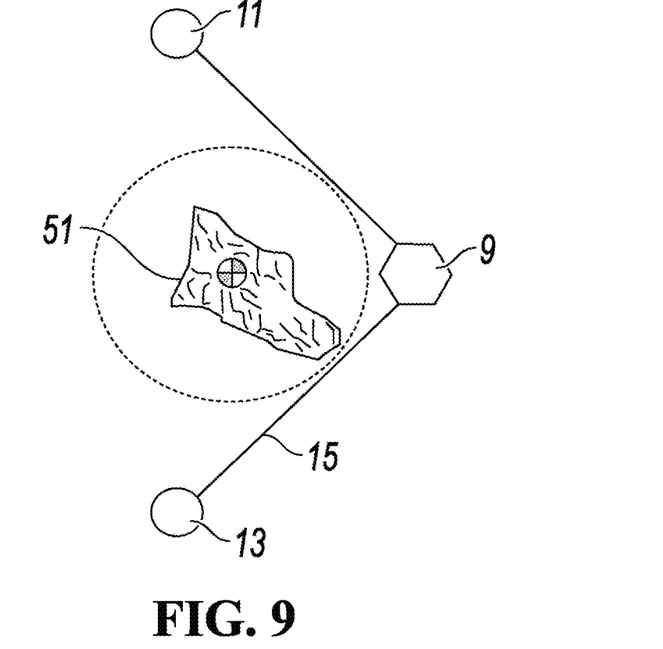
FIG. 9 illustrates the spacecraft using angular momentum to match the tumble rate of the client object and zero out all relative motion.

FIG. 9 illustrates the system comprising spacecraft bus 9, counter masses 11 and 13, and expandable and collapsible truss structure 15 using angular momentum to match the tumble rate of client object 51 and zero out all relative motion.

It could be done a single axis at a time, but combining axial momentum maneuvers may also offer some limited benefits in terms of fuel efficiency, if chemical thrust is to be used. It could be expected to take several minutes, but likely less than an hour, depending on the tumbling rates and modes of the client.

Momentum can be generated by mechanical flywheels, aka reaction wheels, aka momentum wheels. For very large torques, Control Moment Gyroscope(s) are another hardware option to use, and they are more power efficient than reaction wheels, but they are quite expensive. Angular momentum is not transferred from the bus to the client object until after a mechanical connection is made through a robotic arm or other device. At that point, angular momentum is transferred in order to slow the absolute rotation rates of the combined system. It may be more time efficient to use thrusters in some scenarios.

A servicer may address multiple clients, some rotating slowly and some rotating more quickly. The rotational speed is affected in some cases by how the object failed. Tumbling objects sometimes slow down over time, though external forces may also speed tumble rates. Tumbling rate can be expressed in radians per second, but radians per second doesn't fully define a tumbling mode. Tumbling mode is usually assessed from ground by telescopes or radar; however, a much more accurate description can be made by a spacecraft in the immediate vicinity of the object.

Figure 10:
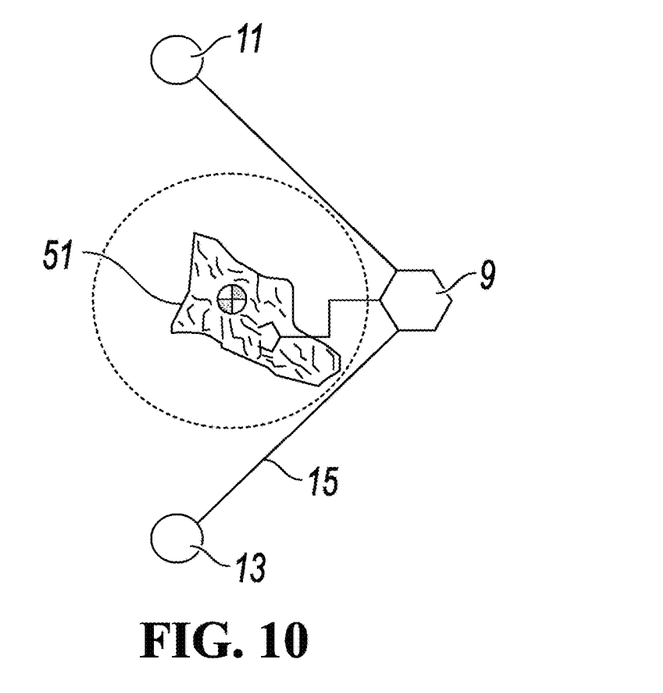
FIG. 10 illustrates the spacecraft safely grasping the client object with zero relative velocity and rotation.

FIG. 10 illustrates appendage 53 from the system comprising spacecraft bus 9, counter masses 11 and 13, and expandable and collapsible truss structure 15 safely grasping client object 51 with zero relative velocity and rotation.

In embodiments, appendage 53 can be, among many alternatives, robotic clamps or grippers, a robotic arm, or robotic tentacles. A non-rigid connection is not ideal here, as after attaching, angular momentum must be transferred to the client in order to detumble. A tethered connection (or net) is not reliable for transference of momentum.

After a rigid connection is made with the tumbling client, the servicer spacecraft will then detumble the joint system by reducing its absolute tumbling rates and applying torque through the rigid connection via flywheels, magnetorquers, or thrusters. Once the joint system is no longer tumbling, then other activities can take place, such as servicing, refueling or relocation. Appendage 53 can be deployed to capture client object 51 by specific grapple points if such points exist on client object Si. or can grasp client object 51 at a variety of points if no specific grapple points exist.

Once a hold has been attained on client object 51, appendage 53 from the system comprising spacecraft bus 9, counter masses 11 and 13, and expandable and collapsible truss structure 15 can adjust the grip configuration in a variety of fashions to secure it for servicing or transport. For example, relocating the grip may use robotic fingers for stable transitions, or robotic latching mechanisms can be used.

Figure 11:
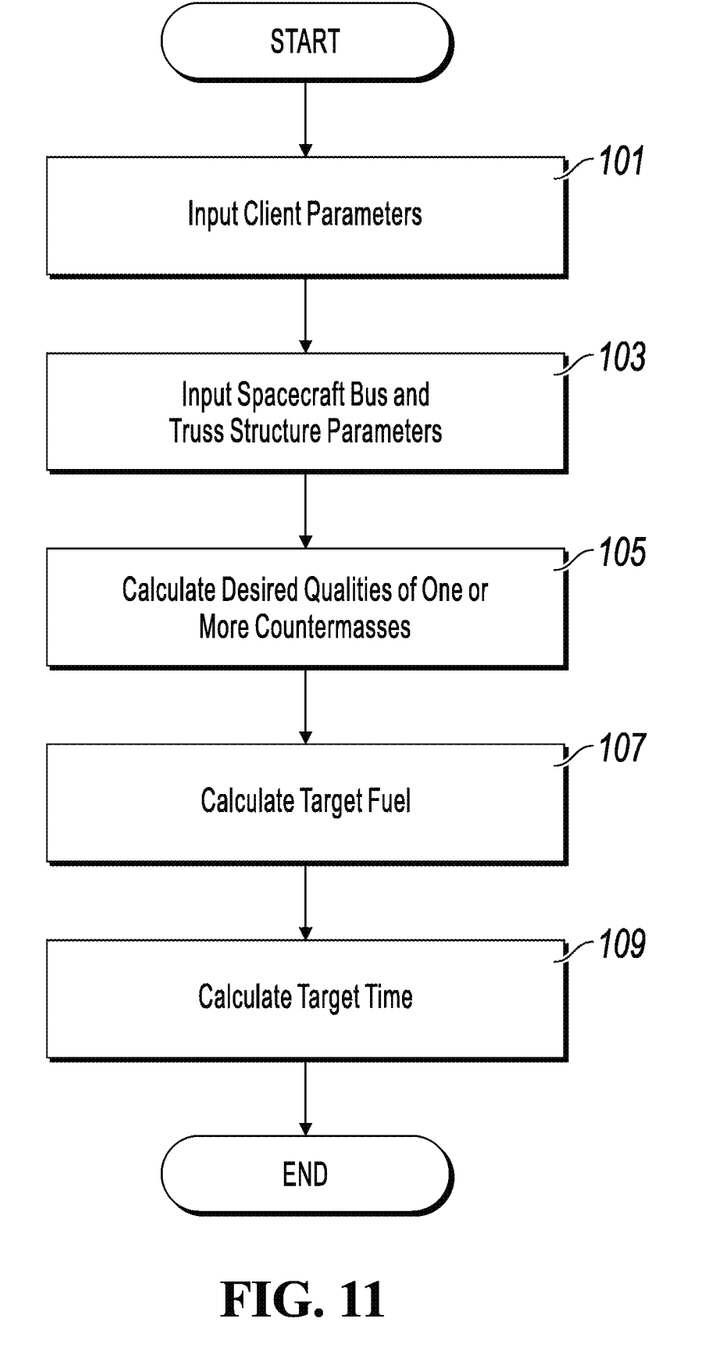
FIG. 11 is a flow chart illustrating steps in a computer-implemented method of designing one or more counter mass(es).

FIG. 11 is a flow chart illustrating steps in a computer-implemented method of designing one or more counter mass(es) that is the subject of one embodiment. In embodiments, many variations on this method are possible, and in fact it is likely that the order of steps may be changed from one embodiment to another.

One embodiment is computer-implemented method of calculating parameters of a spacecraft comprising: inputting, via one or more devices 101, attributes of one or more target clients; inputting, via one or more devices 103, attributes of a spacecraft bus and truss structure; calculating, at one or more processors 105, desired qualities of one or more counter mass(es) according to a ranking previously defined. Devices can be various computer hardware such as a mouse, a keyboard, or various memory types.

Desired qualities can be various design and aeronautical parameters associated with the projected performance of one or more counter mass(es). Thus, output of desired qualities can provide useful information about manufacturing processes for one or more counter mass(es), including materials used, sizes of components and assemblies, and shapes of components and assemblies.

Desired qualities can be output in various data formats, including various spreadsheet and various word processing programs, as well as various file formats which can be used in Computer-Aided Design.

Previously defined rankings can weight, in response to data received about a client, different design and aeronautical parameters in different amounts according to mission objectives associated with that client. Previously defined rankings can be input via an I/O device such as a keyboard, mouse, or memory.

Other embodiments can comprise calculating 107 target masses of a fuel for a spacecraft bus. Still other embodiments can comprise calculating 109 a target time of one or more of launch, rendezvous and disposal of a client object.

The embodiments described above are given for the purpose of facilitating the understanding of the present invention and does not intend to limit the interpretation of the present invention. The respective elements and their arrangements, materials, conditions, shapes, sizes, or the like of the embodiment are not limited to the illustrated examples but may be appropriately changed. Further, the constituents described in the embodiment may be partially replaced or combined together.

The invention claimed is:

1. A method comprising:
propelling a servicing spacecraft to an object;
deploying one or more counter masses away from a bus of the servicing spacecraft to offset a center of mass of the servicing spacecraft into an empty volume;
approaching the object, by the servicing spacecraft;
positioning the center of mass of the servicing spacecraft in approximately the same location as the center of mass of the object;
imparting angular momentum to the servicing spacecraft to match the tumble rate of the object; and
mechanically connecting the object, by an appendage, to the servicing spacecraft.

2. The method according to claim 1, further comprising using one or more of ion beams, electromagnetic induction, magnet torquers, and applied fluidic forces to apply a torque to the object.

3. A spacecraft comprising:
a bus;
one or more counter masses; and
a truss structure connecting the bus and the one or more counter masses;
wherein the truss is configured to deploy the counter masses away from the bus to offset the center of mass of the spacecraft into an empty volume at least partially defined by the truss, the empty volume having a circular cross-section having a diameter greater than that of a space object; and
wherein no portion of the spacecraft extends into the empty volume.

4. The spacecraft according to claim 3, wherein the number of counter masses is in the range two to three.

5. The spacecraft according to claim 3, further comprising one or more mechanical attachments which grasp the space object.

6. The spacecraft according to claim 3, wherein the spacecraft is configured reduce an absolute rotation rate of the tumbling space object by ion beams, electromagnetic induction, or applied fluidic forces.

7. The spacecraft according to claim 3, wherein the truss structure is expandable.

8. The spacecraft according to claim 3, wherein the truss structure is collapsible.

9. The spacecraft according to claim 3, wherein the truss structure is configured to deploy with sufficient clearance to allow a center of mass of the spacecraft to approximately match a center of mass of the tumbling space object.

* * * * *